US012570544B2

(12) United States Patent
 Du et al.

(10) Patent No.: US 12,570,544 B2
(45) Date of Patent: Mar. 10, 2026

(54) COATED NICKEL-RICH TERNARY MATERIAL, PREPARATION METHOD AND APPLICATION THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Shaolin Du, Guangdong (CN); Peng Hou, Guangdong (CN); Haijun Yu, Guangdong (CN); Yinghao Xie, Guangdong (CN); Xuemei Zhang, Guangdong (CN); Banglai Ming, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 568 days.

(21) Appl. No.: 18/139,927

(22) Filed: Apr. 26, 2023

(65) Prior Publication Data

US 2023/0264974 A1 Aug. 24, 2023

Related U.S. Application Data

(63) Continuation of application No. PCT/CN2021/123410, filed on Oct. 13, 2021.

(30) Foreign Application Priority Data

Oct. 26, 2020 (CN) .......................... 202011155591.1

(51) Int. Cl.
 *C01G 53/50* (2025.01)
 *H01M 10/052* (2010.01)

(52) U.S. Cl.
 CPC .......... *C01G 53/50* (2013.01); *H01M 10/052* (2013.01); *C01P 2006/40* (2013.01)

(58) Field of Classification Search
 CPC ................................ H01M 4/10; H01M 50/56
 See application file for complete search history.

(56) References Cited

U.S. PATENT DOCUMENTS

2020/0343539 A1* 10/2020 Bresser .................. C01G 53/50

FOREIGN PATENT DOCUMENTS

| CN | 107069006 A | 8/2017 |
| CN | 107742721 A | 2/2018 |

(Continued)

OTHER PUBLICATIONS

Cho et al., "Investigation of new manganese orthophosphate Mn3(PO4)2 coating for nickel-rich LiNi0.6Co0.2Mn0.2O2 cathode and improvement of its thermal properties", Electrochimica Acta, 198, Mar. 2016, pp. 77-83.*

(Continued)

*Primary Examiner* — Khanh T Nguyen
(74) *Attorney, Agent, or Firm* — Westbridge IP LLC

(57) ABSTRACT

The present disclosure belongs to the field of battery materials, and discloses a coated nickel-rich ternary material and a preparation method and application thereof. The coated nickel-rich ternary material has a chemical formula of $LiNi_xCo_yMn_zO_2 \cdot a[M_3(PO_4)_2 \cdot bH_2O]$, Where $0.6 \leq x \leq 0.8$, $0.1 \leq y \leq 0.2$, $0.1 \leq z \leq 0.2$, $x+y+z=1$, $0.01 \leq a \leq 0.03$, $3 \leq b \leq 8$, $M_3(PO_4)_2 \cdot bH_2O$ is at least one selected from the group consisting of nickel phosphate, cobalt phosphate and manganese phosphate; the coated nickel-rich ternary material has a flower-like structure. The preparation method of the (Continued)

present disclosure provides phosphate ions through the prepared phosphate solution, performs coating in a liquid phase environment, and synthesizes the precursor simultaneously by microwave hydrothermal synthesis, which is beneficial to the full contact between the phosphates and the precursor, and ensures the surface of the nickel-rich ternary precursor is uniformly coated with the phosphates. The method is simple and has good coating effect.

8 Claims, 2 Drawing Sheets

(56) References Cited

FOREIGN PATENT DOCUMENTS

| CN | 109920993 A | 6/2019 | |
|----|-------------|--------|---|
| WO | WO 2019141981 A1 * | 7/2019 | .............. H01M 4/36 |

OTHER PUBLICATIONS

International Search Report of PCT Patent Application No. PCT/CN2021/123410 issued on Jan. 13, 2022.

* cited by examiner

COATED NICKEL-RICH TERNARY MATERIAL, PREPARATION METHOD AND APPLICATION THEREOF

CROSS-REFERENCE TO RELATED APPLICATIONS

The present application is a continuation application of PCT application No. PCT/CN2021/123410 filed on Oct. 13, 2021, which claims the benefit of Chinese Patent Application No. 202011155591.1 filed on Oct. 26, 2020. The contents of all of the aforementioned applications are incorporated by reference herein in their entirety.

TECHNICAL FIELD

The present disclosure relates to the field of battery materials, and in particular to a coated nickel-rich ternary material and a preparation method and application thereof.

BACKGROUND

Due to high energy density and cost efficiency, the nickel-rich nickel-cobalt-manganese ternary layered oxide $LiNi_xCo_yMn_zO_2$ ($0.6 \le x \le 0.9$, $0.05 \le y \le 0.2$, $0.05 \le z \le 0.2$, Chinese abbreviated as NCM) has become the mainstream cathode material for next-generation lithium-ion batteries. At present, commonly used cathode materials for lithium-ion batteries are polyanionic material $LiFePO_4$, layered material $LiCoO_2$, and layered ternary material $LiNi_xCo_yMn_zO_2$. Compared with other materials, ternary materials have attracted much attention because of their high energy density, high voltage platform, and high specific capacity. The content of nickel in the ternary material has a relatively greater impact on its electrochemical performance. The higher the content of nickel, the higher the energy density and the higher the capacity. To meet the needs for long-life, large-capacity lithium-ion batteries, the development of ternary materials with higher nickel content has become a research hotspot nowadays.

However, nickel-rich ternary materials have many shortcomings, such as reduced electrochemical performance caused by cation mixing, reduced thermal stability and relatively poor electrical conductivity due to the higher nickel content, highly polarization and rapid capacity decay caused by unstable surface structure, material failure caused by volume effect, and electrochemical performance degradation caused by excessive surface alkali content. There is a large amount of residual lithium on the ternary material surface, which easily reacts with an electrolyte to form an insulating material, hinders the transmission of lithium ions, reduces the rate performance and cycle stability, and improves the thermal stability of the material. In addition, a ternary electrode material is prone to excessive delithiation during the cycle. As the charging progresses, their surface structure encounters excessive delithiation. At the same time, the layered structure of a nickel-rich ternary material converts to a spinel structure or an inert rock salt structure. Usually, after the first few charge and discharge, the surface layer of the material forms a thick inert layer. In addition, the highly oxidizing high-valent transition metal ions on the surface have serious side reactions with the electrolyte, which also causes increasing polarization of the battery and fast capacity decay. With increase of the nickel content in ternary materials, these problems will become more obvious, seriously hindering the application scale of ternary materials.

To solve the problems of ternary materials, a lot of research work has been engaged. Studies have shown that surface coating can effectively stabilize the surface crystal structure of ternary materials during charging and discharging, and improve the cycle stability of the materials. Common oxide coatings (such as $Al_2O_3$, $Cr_2O_3$, $SnO_2$, $ZnO$, $MgO$, etc.), Phosphate coating (such as $Sn_3(PO_4)_2$, $Mg_3(PO_4)_2$, $AlPO_4$, $FePO_4$, $Co(PO_4)_2$, etc.), Li—X—O compounds coating (such as $LiAlO_2$, $Li_2ZrO_3$, $LiAlO_2$, etc.), carbon coating, fluoride coating, etc. In existing coating technique, the coating process is complicated, and the coating effect is not satisfied.

SUMMARY OF THE INVENTION

An objective of the present disclosure is to provide a coated nickel-rich ternary material and a preparation method and application thereof. It is also aimed to improve the electrochemical performance of nickel-rich ternary cathode materials for lithium ion batteries, and increase the specific capacity, rate performance and cycle performance of the materials.

In this regard, the present disclosure adopts the following technical solution.

A coated nickel-rich ternary material having the chemical formula of $LiNi_xCo_yMn_zO_2 \cdot a[M_3(PO_4)_2 \cdot bH_2O]$, wherein $0.6 \le x \le 0.8$, $0.1 \le y \le 0.2$, $0.1 \le z \le 0.2$, $x+y+z=1$, $0.01 \le a \le 0.03$, $3 \le b \le 8$; $M_3(PO_4)_2 \cdot bH_2O$ is at least one selected from the group consisting of nickel phosphate, cobalt phosphate and manganese phosphate; the coated nickel-rich ternary material has a flower-like structure, and it is a phosphate coated nickel-rich ternary material.

In some embodiments, the coated nickel-rich ternary material has a first reversible capacity of 173-195 mAh/g at a current of 0.1 C, and its specific surface area is 27-38 $m^2/g$.

A preparation method of a coated nickel-rich ternary material, comprising the following steps:

(1) Dissolving and mixing a nickel source, a cobalt source, and a manganese source in a solvent to obtain solution A, mixing a surfactant to the solution A to obtain solution B;

(2) Mixing a phosphate solution with the solution B to obtain a mixture, subjecting the mixture to microwave hydrothermal synthesis to obtain precipitate C;

(3) Washing the precipitate C with water, followed by drying and grinding the precipitate to obtain coated nickel-rich ternary precursor powder D;

(4) Mixing the coated nickel-rich ternary precursor powder D with a lithium source to obtain a mixture, followed by subjecting the mixture to calcinating, grinding and screening to obtain a coated nickel-rich ternary material.

Ammonium phosphate reacts with the metal nickel, cobalt, and manganese in the precursor to generate phosphates in situ which coat the surface of the material.

In some embodiments, in step (1), the nickel source, cobalt source and manganese source are at least one selected from the group consisting of the respective sulfate, nitrate or acetate of nickel, cobalt or manganese.

In some embodiments, in step (1), the molar ratio of the nickel source, cobalt source, and manganese source is (0.6-0.8):(0.1-0.2):(0.1-0.2).

In some embodiments, in step (1), the molar ratio of the nickel source, cobalt source, and manganese source is 0.8:0.1:0.1 or 0.6:0.2:0.2.

In some embodiments, in step (1), the solvent is water.

In some embodiments, in step (1), total concentration of the metal ions in the solution A is 1-1.5 mol/L.

In some embodiments, in step (1), the surfactant is at least one selected from the group consisting of sodium dodecylbenzene sulfonate and sodium dodecyl sulfate.

In some embodiments, in step (1), the content of the surfactant is 0.01-0.03 mol/L.

In some embodiments, in step (2), the phosphate is at least one selected from the group consisting of ammonium dihydrogen phosphate, diammonium phosphate and ammonium phosphate.

In some embodiments, in step (2), the concentration of the phosphate solution is 0.01-0.03 mol/L.

In some embodiments, in step (2), the microwave hydrothermal synthesis is carried out at a temperature of 140° C.-220° C., and the time for the microwave hydrothermal synthesis is 10-20 minutes.

In some embodiments, in step (3), the drying is carried out at a temperature of 120° C.-200° C., and the time for the drying is 2-4 hours.

In some embodiments, in step (4), the lithium source is lithium carbonate or lithium hydroxide.

In some embodiments, in step (4), the mass ratio of the content of lithium in the lithium source to the total amount of metal elements in the coated nickel-rich ternary precursor powder D is (1-1.1):1.

In some embodiments, in step (4), the calcinating is carried out at a temperature of 600° C.-900° C., and the time for the calcining is 8-16 h.

In some embodiments, in step (4), the calcining is carried out in an atmosphere of oxygen, and the flow rate of the oxygen is 0.2-0.4 mL/min.

In some embodiments, in step (4), the screening is carried out using a 325-400 mesh sieve.

Principles

In the above preparation method, phosphate ions are provided by the prepared phosphate solution, and coating proceeds in a liquid phase environment while a precursor is synthesized simultaneously by a microwave hydrothermal synthesis method, which facilitates full contact of the phosphate ions with the solution B, and ensures the surface of the nickel-rich ternary precursor produced is uniformly coated with the phosphates. Then the phosphates react with the metal ions in the material during the calcinating process to generate metal phosphates. The method is simple and coating effective. In addition, a surfactant is added when the precursor is synthesized. The synthesized nickel-rich ternary precursor has a flower-like morphology. A flower-like structure belongs to a hierarchical structure (a ternary material with a hierarchical structure, which prohibits the undesirable consequences caused by structural changes based on the morphology of the precursor), has large specific surface area, good contact with electrolyte, and excellent interface effect formed, which can improve the cycle performance of the battery.

A lithium battery includes the coated nickel-rich ternary material.

Advantages of the Present Disclosure (1) The present disclosure provides phosphate ions by a prepared phosphate solution, performs a coating process in a liquid phase environment, and synthesizes a precursor simultaneously by a microwave hydrothermal synthesis method, which facilitates full contact of the phosphate ions with the precursor, and ensures the surface of the nickel-rich ternary precursor produced is uniformly coated with the phosphates. The method is simple, and the electrochemical performance of the material is enhanced.

(2) The present disclosure includes introducing a surfactant when preparing the coated nickel-rich ternary precursor, and the synthesized nickel-rich ternary precursor has a flower-like morphology. A coated nickel-rich ternary cathode material with flower-like morphology is synthesized by the precursor and lithium salt using a high temperature solid-phase synthesis method. The cathode material has a relatively high specific surface area, good contact with the electrolyte, and excellent interfacial effect formed. A battery using the material for preparation of the cathode shows excellent cycle performance.

(3) In the present disclosure, a nickel-rich ternary precursor coated with phosphate ions is mixed with a lithium source, and a coating layer of lithium phosphate is formed in situ on the surface of the material in a one-step calcinating process, and a coated nickel-rich ternary material is obtained after the calcinating. This method is simple and has good repeatability.

DETAILED DESCRIPTION OF THE EMBODIMENTS

Figure 1:
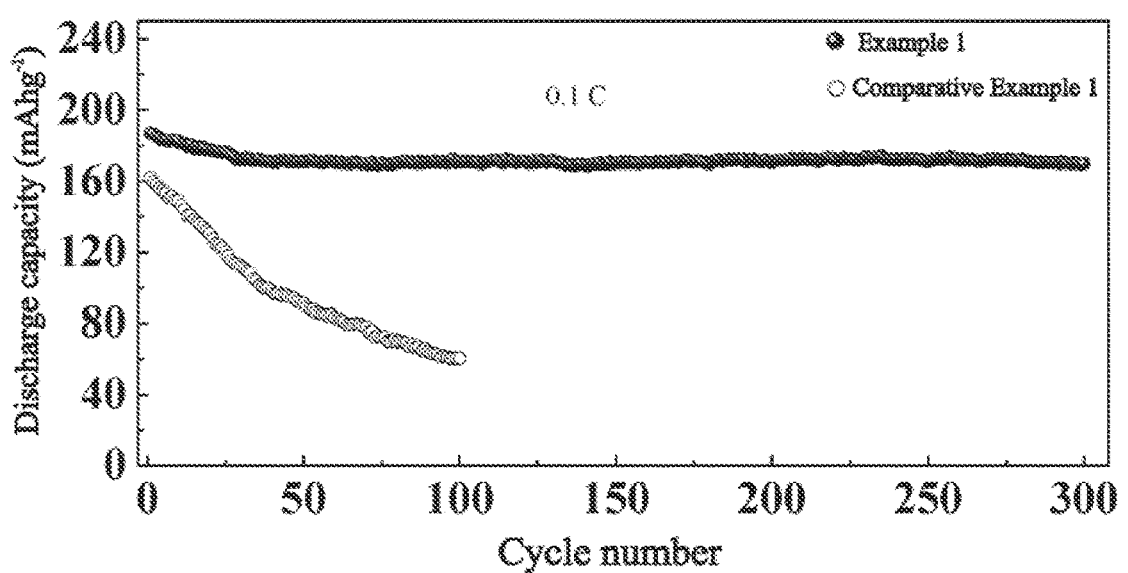
FIG. 1 is a graph of the cycle performance of the materials prepared in Example 1 and Comparative Example 1 at a current density of 0.1 C.

In order to fully understand the present disclosure, the preferred experimental scheme of the present disclosure will be described below in conjunction with examples to further illustrate the characteristics and advantages of the present disclosure. Any change or alteration that does not deviate from the gist of the present disclosure can be understood by those skilled in the art. The scope of protection of the present disclosure is determined by the scope of the claims.

Where specific conditions are not indicated in the embodiments of the present disclosure, it shall be carried out under the conventional conditions or the conditions recommended by the manufacturer. The raw materials, reagents, etc. used without indicating their manufacturers are all conventional products commercially available.

Example 1

A preparation method of a coated nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;

(2) Preparing a solution of sodium dodecylbenzene sulfonate with a concentration of 0.02 mol/L and an ammonium dihydrogen phosphate solution with a concentration of 0.02 mol/L, which are mixed with the solution A to obtain solution B;

(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;

(4) Fully grinding and mixing the coated nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 12 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.8}Co_{0.1}Mn_{0.1}O_2 \cdot 0.02[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 193 mAh/g at a current of 0.1 C.

The coated nickel-rich ternary material prepared by the above method has shown excellent electrochemistry performance as a cathode material for lithium ion batteries. Its first reversible capacity reached 193 mAh/g at a current of 0.1 C, and the reversible capacity remained 170 mAh/g after 300 charge-discharge cycles, and the capacity retention rate was 88%. After 200 charge-discharge cycles at a current of 5 C, the reversible capacity still remained 153 mAh/g, and the capacity retention rate was as high as 85%. The rate performance test showed that when the current was changed from 0.1 C to 0.5 C, 1 C, 2 C, 5 C, 10 C, the batteries all showed excellent cycle performance. When the current was changed to 0.1 C, the reversible capacity was still 185 mAh/g. Compared with the first reversible capacity, the capacity retention rate was as high as 93%.

Example 2

A preparation method of a coated nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;

(2) Preparing a solution of sodium dodecylbenzene sulfonate with a concentration of 0.01 mol/L and an ammonium dihydrogen phosphate solution with a concentration of 0.01 mol/L, which are mixed with the solution A to obtain solution B;

(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;

(4) Fully grinding and mixing the coated nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 12 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.8}Co_{0.1}Mn_{0.1}O_2 \cdot 0.01[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 195 mAh/g at a current of 0.1 C.

The coated nickel-rich ternary material prepared by the above method has shown excellent electrochemistry performance as a cathode material for lithium ion batteries. Its reversible capacity reached 195 mAh/g for the first time at a current of 0.1 C, and the reversible capacity remained 166 mAh/g after 300 charge-discharge cycles, and the capacity retention rate was 85%. After 200 charge-discharge cycles at a current of 5 C, the reversible capacity still remained 141 mAh/g, and the capacity retention rate was as high as 80%. The rate performance test showed that when the current was changed from 0.1 C to 0.5 C, 1 C, 2 C, 5 C, 10 C, the batteries all showed excellent cycle performance. When the current was changed to 0.1 C, the reversible capacity was still 178 mAh/g. Compared with the first reversible capacity, the capacity retention rate was as high as 90%.

Example 3

A preparation method of a coated nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;

(2) Preparing a solution of sodium dodecylbenzene sulfonate with a concentration of 0.03 mol/L and an ammonium dihydrogen phosphate solution with a concentration of 0.03 mol/L, which are mixed with the solution A to obtain solution B;

(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;

(4) Fully grinding and mixing the coated nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 12 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.8}Co_{0.1}Mn_{0.1}O_2 \cdot 0.03[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 188 mAh/g at a current of 0.1 C.

The coated nickel-rich ternary material prepared by the above method has shown excellent electrochemistry performance as a cathode material for lithium ion batteries. Its reversible capacity reached 188 mAh/g for the first time at a current of 0.1 C, and the reversible capacity remained 161 mAh/g after 300 charge-discharge cycles, and the capacity retention rate was 88%. After 200 charge-discharge cycles at a current of 5 C, the reversible capacity still remained 151 mAh/g, and the capacity retention rate was as high as 81%. The rate performance test showed that when the current was changed from 0.1 C to 0.5 C, 1 C, 2 C, 5 C, 10 C, the batteries all showed excellent cycle performance. When the current was changed to 0.1 C, the reversible capacity was still 172 mAh/g. Compared with the first reversible capacity, the capacity retention rate was as high as 88%.

Example 4

A preparation method of a coated nickel-rich ternary material, comprising the following steps:
(1) Preparing a solution of nickel nitrate, cobalt nitrate and manganese acetate with a molar ratio of Ni:Co:Mn=0.6:0.2:0.2 and a total concentration of 1 mol/L; Dissolving the above-mentioned salt solution in 200 mL deionized water and stirring until the salt solution is completely dissolved to obtain solution A;
(2) Preparing a solution of sodium dodecylbenzene sulfonate with a concentration of 0.02 mol/L and an ammonium dihydrogen phosphate solution with a concentration of 0.02 mol/L, which are mixed with the solution A to obtain solution B;
(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;
(4) Fully grinding and mixing the coated nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 12 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.6}Co_{0.2}Mn_{0.2}O_2 \cdot 0.02[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 183 mAh/g at a current of 0.1 C.

The coated nickel-rich ternary material prepared by the above method has shown excellent electrochemistry performance as a cathode material for lithium ion batteries. Its reversible capacity reached 183 mAh/g for the first time at a current of 0.1 C, and the reversible capacity remained 159 mAh/g after 300 charge-discharge cycles, and the capacity retention rate was 88%. After 200 charge-discharge cycles at a current of 5 C, the reversible capacity still remained 146 mAh/g, and the capacity retention rate was as high as 86%. The rate performance test showed that when the current was changed from 0.1 C to 0.5 C, 1 C, 2 C, 5 C, 10 C, the batteries all showed excellent cycle performance. When the current was changed to 0.1 C, the reversible capacity was still 171 mAh/g. Compared with the first reversible capacity, the capacity retention rate was as high as 86%.

Example 5

A preparation method of a coated nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;
(2) Preparing a solution of sodium dodecylbenzene sulfonate with a concentration of 0.02 mol/L and an ammonium dihydrogen phosphate solution with a concentration of 0.02 mol/L, which are mixed with the solution A to obtain solution B;
(3) Placing the solution B in a microwave digestion apparatus, performing hydrothermal reaction at 140° C. for 15 minutes to obtain a hydrothermal product, washing the product several times with deionized water, and keeping the product in an oven at 120° C. for 3 hours to obtain a coated nickel-rich ternary Precursor;
(4) Fully grinding and mixing the coated nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 12 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.8}Co_{0.1}Mn_{0.1}O_2 \cdot 0.02[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 181 mAh/g at a current of 0.1 C.

The coated nickel-rich ternary material prepared by the above method has shown excellent electrochemistry performance as a cathode material for lithium ion batteries. Its reversible capacity reached 181 mAh/g for the first time at a current of 0.1 C, and the reversible capacity remained 153 mAh/g after 300 charge-discharge cycles, and the capacity retention rate was 85%. After 200 charge-discharge cycles at a current of 5 C, the reversible capacity still remained 151 mAh/g, and the capacity retention rate was as high as 81%. The rate performance test shows that when the current was changed from 0.1 C to 0.5 C, 1 C, 2 C, 5 C, 10 C, the batteries all showed excellent cycle performance. When the current was changed to 0.1 C, the reversible capacity was still 171 mAh/g. Compared with the first reversible capacity, the capacity retention rate was as high as 85%.

Example 6

A preparation method of a coated nickel-rich ternary material, comprising the following steps:
(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;
(2) Preparing a solution of sodium dodecylbenzene sulfonate with a concentration of 0.02 mol/L and an ammonium dihydrogen phosphate solution with a concentration of 0.02 mol/L, which are mixed with the solution A to obtain solution B;
(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;

(4) Fully grinding and mixing the coated nickel-rich ternary precursor with a lithium source, and the stoichiometric ratio of the lithium content in the lithium source to the total metal ion content in the solution A prepared in step (1) is 1.1:1 to obtain a mixture, and then keeping the mixture at a temperature of 600° C. for 8 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.8}Co_{0.1}Mn_{0.1}O_2 \cdot 0.02[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 173 mAh/g at a current of 0.1 C.

The coated nickel-rich ternary material prepared by the above method has shown excellent electrochemistry performance as a cathode material for lithium ion batteries. Its reversible capacity reached 173 mAh/g for the first time at a current of 0.1 C, and the reversible capacity remained 152 mAh/g after 300 charge-discharge cycles, and the capacity retention rate was 87%. After 200 charge-discharge cycles at a current of 5 C, the reversible capacity still remained 143 mAh/g, and the capacity retention rate was as high as 80%. The rate performance test showed that when the current was changed from 0.1 C to 0.5 C, 1 C, 2 C, 5 C, 10 C, the batteries all showed excellent cycle performance. When the current was changed to 0.1 C, the reversible capacity was still 157 mAh/g. Compared with the first reversible capacity, the capacity retention rate was as high as 81%.

Example 7

A preparation method of a coated nickel-rich ternary material, comprising the following steps:

(1) Preparing a solution of nickel nitrate, cobalt nitrate and manganese acetate with a molar ratio of Ni:Co:Mn=0.6:0.2:0.2 and a total concentration of 1 mol/L; Dissolving the above-mentioned salt solution in 200 mL deionized water and stirring until the salt solution is completely dissolved to obtain solution A;

(2) Preparing a solution of sodium dodecylbenzene sulfonate with a concentration of 0.02 mol/L and an ammonium dihydrogen phosphate solution with a concentration of 0.02 mol/L, which are mixed with the solution A to obtain solution B;

(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;

(4) Fully grinding and mixing the coated nickel-rich ternary precursor with a lithium source, and the stoichiometric ratio of the lithium content in the lithium source to the total metal ion content in the solution A prepared in step (1) is 1.1:1 to obtain a mixture, and then keeping the mixture at a temperature of 900° C. for 16 h in an oxygen atmosphere, fully grinding the mixture after annealing and then sieving it using a 325-mesh sieve to obtain a coated nickel-rich ternary material.

The coated nickel-rich ternary material prepared by the above method has a chemical formula of $LiNi_{0.6}Co_{0.2}Mn_{0.2}O_2 \cdot 0.02[M_3(PO_4)_2 \cdot bH_2O](M=Ni/Co/Mn, b=3/8)$ (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 173 mAh/g at a current of 0.1 C.

The coated nickel-rich ternary material prepared by the above method has shown excellent electrochemistry performance as a cathode material for lithium ion batteries. Its reversible capacity reached 173 mAh/g for the first time at a current of 0.1 C, and the reversible capacity remained 149 mAh/g after 300 charge-discharge cycles, and the capacity retention rate was 86%. After 200 charge-discharge cycles at a current of 5 C, the reversible capacity still remained 136 mAh/g, and the capacity retention rate was as high as 81%. The rate performance test showed that when the current was changed from 0.1 C to 0.5 C, 1 C, 2 C, 5 C, 10 C, the batteries all showed excellent cycle performance. When the current was changed to 0.1 C, the reversible capacity was still 161 mAh/g. Compared with the first reversible capacity, the capacity retention rate was as high as 83%.

Comparative Example 1 (without Elements Coated or Surfactant Added)

A preparation method of a nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;

(2) Placing the solution A in a microwave digestion apparatus, performing hydrothermal reaction at 180° C. for 15 minutes to obtain a hydrothermal product, washing the product several times with deionized water, and keeping the product in an oven at 160° C. for 3 hours to obtain a nickel-rich ternary Precursor;

(3) Fully grinding and mixing the nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 8 h in an oxygen atmosphere, fully grinding the mixture after annealing and then sieving it using a 325-mesh sieve to obtain a nickel-rich ternary material.

The nickel-rich ternary material prepared by the above method has a chemical formula of $LiNi_{0.8}Co_{0.1}Mn_{0.1}O_2$, and its first reversible capacity reached 158 mAh/g at a current of 0.1 C. The nickel-rich ternary material prepared by the above method has shown excellent electrochemistry performance as a cathode material for lithium ion batteries. Its first reversible capacity reached 158 mAh/g at a current of 0.1 C, and the reversible capacity remained 102 mAh/g after 100 charge-discharge cycles, and the capacity retention rate was 86%. After 100 charge-discharge cycles at a current of 5 C, the reversible capacity was 62 mAh/g, and the capacity retention rate was 43%. The rate performance test showed that when the current was changed from 0.1 C to 0.5 C, 1 C, 2 C, 5 C, 10 C, the batteries showed average cycle performance. When the current was changed to 0.1 C, the reversible capacity was 93 mAh/g. Compared with the first reversible capacity, the capacity retention rate was 57%.

Comparative Example 2 (without Elements Coated)

A preparation method of a flower-like nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;

(2) Preparing a solution of sodium dodecylbenzene sulfonate with a concentration of 0.02 mol/L, which are mixed with the solution A to obtain solution B;

(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a flower-like nickel-rich ternary Precursor;

(4) Fully grinding and mixing the nickel-rich ternary precursor with a lithium source, and the stoichiometric ratio of the lithium content in the lithium source to the total metal ion content in the solution A prepared in step (1) is 1.06:1 to obtain a mixture, and then keeping the mixture at a temperature of 750° C. for 8 h in an oxygen atmosphere, fully grinding the mixture after annealing and then sieving it using a 325-mesh sieve to obtain a nickel-rich ternary material.

The nickel-rich ternary material prepared by the above method has a chemical formula of $LiNi_{0.8}Co_{0.1}Mn_{0.1}O_2$, its first reversible capacity reached 179 mAh/g at a current of 0.1 C.

The flower-like nickel-rich ternary material prepared by the above method has shown excellent electrochemistry performance as a cathode material for lithium ion batteries. Its reversible capacity reached 179 mAh/g for the first time at a current of 0.1 C, and the reversible capacity remained 122 mAh/g after 100 charge-discharge cycles, and the capacity retention rate was 68%. After 100 charge-discharge cycles at a current of 5 C, the reversible capacity was 79 mAh/g, and the capacity retention rate was 44%. The rate performance test showed that when the current was changed from 0.1 C to 0.5 C, 1 C, 2 C, 5 C, 10 C, the batteries showed average cycle performance. When the current was changed to 0.1 C, the reversible capacity was 91 mAh/g. Compared with the first reversible capacity, the capacity retention rate was 56%.

Comparative Example 3 (without a Surfactant Added)

A preparation method of a coated nickel-rich ternary material, comprising the following steps:

(1) Preparing a solution of nickel nitrate, cobalt nitrate and manganese acetate with a molar ratio of Ni:Co:Mn=0.8:0.1:0.1 and a total concentration of 1 mol/L; Dissolving the above-mentioned salt solution in 200 mL deionized water and stirring until the salt solution is completely dissolved to obtain solution A;

(2) Preparing a solution of ammonium dihydrogen phosphate with a concentration of 0.02 mol/L, which is mixed with the solution A to obtain solution B;

(3) Placing the solution B in a microwave digestion apparatus, performing hydrothermal reaction at 180° C. for 15 minutes to obtain a hydrothermal product, washing the product several times with deionized water, and keeping the product in an oven at 160° C. for 3 hours to obtain a coated nickel-rich ternary Precursor;

(4) Fully grinding and mixing the coated nickel-rich ternary precursor with a lithium source (the stoichiometric ratio of the lithium content in the lithium source to the total metal ion content in the solution A is 1.06:1) to obtain a mixture, and then keeping the mixture at a temperature of 750° C. for 8 h in an oxygen atmosphere, fully grinding the mixture after annealing and then sieving it using a 325-mesh sieve to obtain a coated nickel-rich ternary material.

The nickel-rich ternary material prepared by the above method has a chemical formula of $LiNi_{0.8}Co_{0.1}Mn_{0.1}O_2 \cdot 0.02[M_3(PO_4)_2 \cdot bH_2O](M=Ni/Co/Mn, b=3/8)$, (i.e. $Ni_3(PO_4)_2 \cdot 8H_2O$, $Co_3(PO_4)_2 \cdot 8H_2O$, $Mn_3(PO_4)_2 \cdot 3H_2O$), its first reversible capacity reached 171 mAh/g at a current of 0.1 C.

The coated nickel-rich ternary material prepared by the above method has shown excellent electrochemistry performance as a cathode material for lithium ion batteries. Its reversible capacity reached 171 mAh/g for the first time at a current of 0.1 C, and the reversible capacity remained 112 mAh/g after 100 charge-discharge cycles, and the capacity retention rate was 44%. After 100 charge-discharge cycles at a current of 5 C, the reversible capacity was 89 mAh/g, and the capacity retention rate was 46%. The rate performance test showed that when the current was changed from 0.1 C to 0.5 C, 1 C, 2 C, 5 C, 10 C, the batteries showed average cycle performance. When the current was changed to 0.1 C, the reversible capacity was 89 mAh/g. Compared with the first reversible capacity, the capacity retention rate was 56%.

Compare the preparation conditions and test results of the materials prepared in the examples and comparative examples, the obtained results are shown in Table 1.

Table 1 Comparison of the cycle performance of the materials prepared in Examples 1-7 and Comparative Examples 1-3

| | | | Cycle performance/0.1 C | | Cycle performance/5 C | | Rate performance Mass | |
|---|---|---|---|---|---|---|---|---|
| Item | First reversible capacity | Surface area | Specific capacity/cycles | Capacity retention rate | Specific capacity/cycles | Capacity retention rate | Capacity specific capacity of last cycle | Capacity retention rate |
| Example 1 | 193 mAh/g | 38 | 170 mAhg$^{-1}$/300th | 88% | 153 mAhg$^{-1}$/300th | 85% | 185 mAhg$^{-1}$ | 93% |
| Example 2 | 195 mAh/g | 35 | 166 mAhg$^{-1}$/300th | 85% | 141 mAhg$^{-1}$/200th | 80% | 178 mAhg$^{-1}$ | 90% |
| Example 3 | 188 mAh/g | 31 | 161 mAhg$^{-1}$/300th | 86% | 151 mAhg$^{-1}$/200th | 81% | 172 mAhg$^{-1}$ | 88% |
| Example 4 | 183 mAh/g | 35 | 159 mAhg$^{-1}$/300th | 86% | 146 mAhg$^{-1}$/200th | 86% | 171 mAhg$^{-1}$ | 86% |
| Example 5 | 181 mAh/g | 29 | 163 mAhg$^{-1}$/300th | 85% | 151 mAhg$^{-1}$/200th | 81% | 171 mAhg$^{-1}$ | 85% |
| Example 6 | 173 mAh/g | 27 | 152 mAhg$^{-1}$/300th | 87% | 143 mAhg$^{-1}$/200th | 80% | 157 mAhg$^{-1}$ | 81% |
| Example 7 | 173 mAh/g | 33 | 149 mAhg$^{-1}$/300th | 86% | 136 mAhg$^{-1}$/200th | 81% | 161 mAhg$^{-1}$ | 83% |
| Comparative Example 1 | 158 mAh/g | 15 | 62 mAhg$^{-1}$/100th | 65% | 72 mAhg$^{-1}$/100th | 43% | 93 mAhg$^{-1}$ | 57% |

-continued

|  | First reversible capacity | Surface area | Cycle performance/0.1 C | | Cycle performance/5 C | | Rate performance | |
|---|---|---|---|---|---|---|---|---|
| Item |  |  | Specific capacity/ cycles | Capacity retention rate | Specific capacity/cycles | Capacity retention rate | Mass specific capacity of last cycle | Capacity retention rate |
| Comparative Example 2 | 179 mAh/g | 17 | 76 mAhg$^{-1}$/100th | 68% | 79 mAhg$^{-1}$/100th | 44% | 91 | 56% |
| Comparative Example 2 | 171 mAh/g | 18 | 81 mAhg$^{-1}$/100th | 65% | 89 mAhg$^{-1}$/100th | 46% | 89 mAhg$^{-1}$ | 56% |

Figure 2:
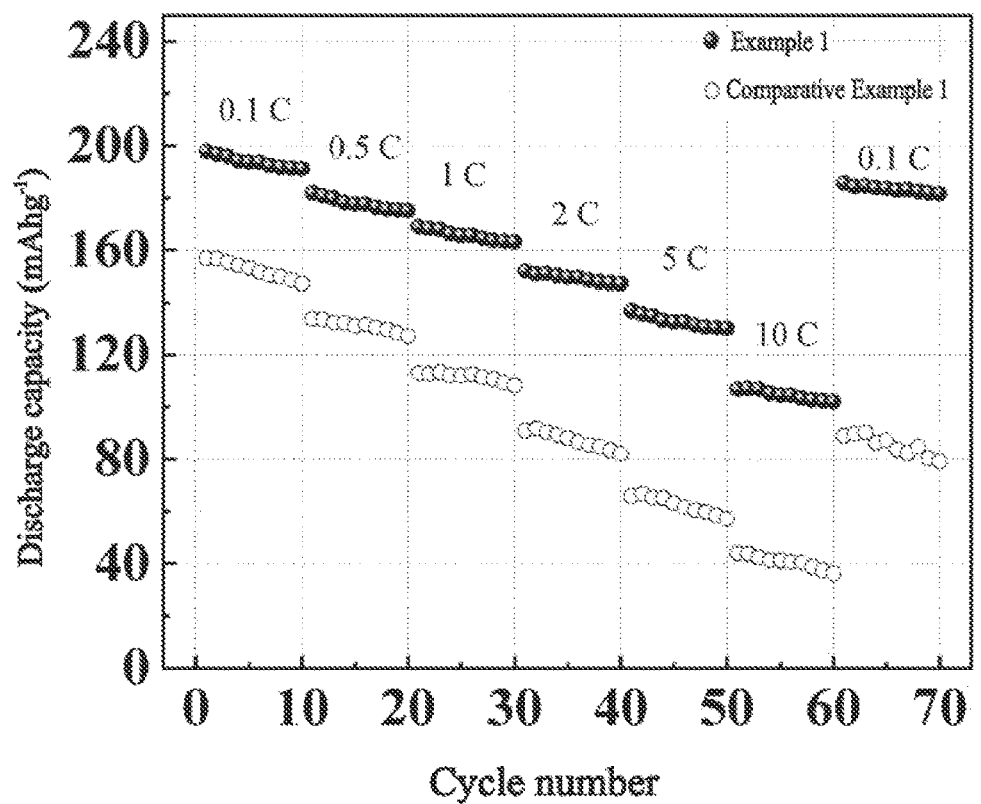
FIG. 2 is the rate performance of the materials prepared in Example 1 and Comparative Example 1.
Figure 3:
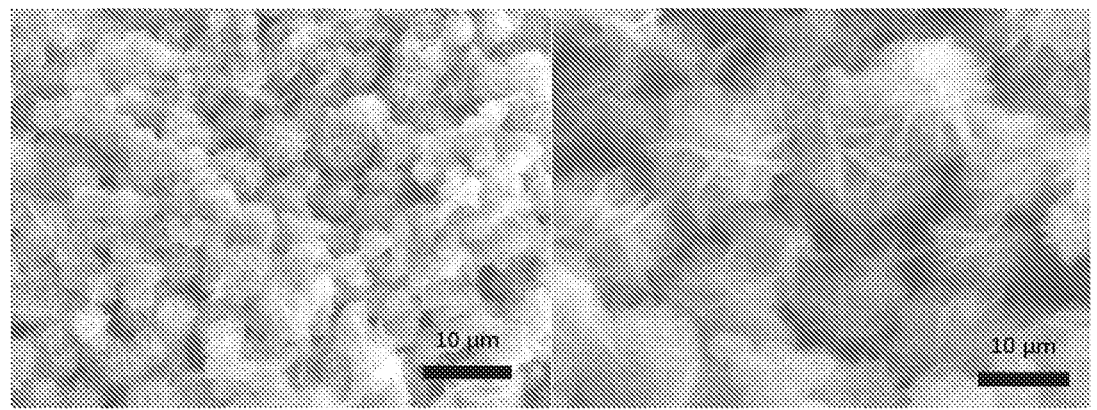
FIG. 3 is the SEM image of the material prepared in Example 1.

It can be seen from Table 1, FIG. 1 and FIG. 2 that the coated nickel-rich ternary material prepared by this present disclosure exhibits high specific capacity and excellent cycle performance. It was cycled 300 times at 5 C current, and the capacity retention rate remained greater than 80%. In addition, it also shows excellent rate performance. It can be concluded from FIG. 3 that the prepared material has a uniformly flower-like shape, which is a uniform morphology.

In the above, a coated nickel-rich ternary material provided by the present disclosure and its preparation method and application have been introduced in detail. Specific examples are used to illustrate the principle and implementation of the present disclosure. The description of the above examples is only used to help understand the method and core idea of the present disclosure, including the best mode, and also enables any skilled in the art to practice the present disclosure, including manufacturing and using any device or system, and implementing any combined method. It should be pointed out that for those of ordinary skill in the art, without departing from the principle of the present disclosure, several improvements and modifications can be made to the present disclosure, and these improvements and modifications also fall within the protection scope of the claims of the present disclosure. The scope of patent protection of the present disclosure is defined by the claims, and may include other embodiments that those skilled in the art can think of. If these other embodiments have structural elements that are not different from the literal expression of the claims, or if they include equivalent structural elements that are not substantially different from the literal expression of the claims, these other embodiments should also be included in the scope of the claims.

The invention claimed is:

1. A coated nickel-rich ternary material, wherein the coated nickel-rich ternary material has a chemical formula of $LiNi_xCo_yMn_zO_2 \cdot a[M_3(PO_4)_2 \cdot bH_2O]$, wherein $0.6 \le x \le 0.8$, $0.1 \le y \le 0.2$, $0.1 \le z \le 0.2$, $x+y+z=1$, $0.01 \le a \le 0.03$, $3 \le b \le 8$; said $M_3(PO_4)_2 \cdot bH_2O$ is at least one selected from the group consisting of nickel phosphate, cobalt phosphate and manganese phosphate; the coated nickel-rich ternary material has a flower-like structure, and is a phosphate-coated nickel-rich ternary material; and a method for preparing the coated nickel-rich ternary material comprises the following steps:

(1) dissolving a nickel source, a cobalt source, and a manganese source in a solvent to obtain solution A, adding and mixing a surfactant with the solution A to obtain solution B, wherein the nickel source is at least one selected from the group consisting of a sulfate of nickel, a nitrate of nickel, and an acetate of nickel; the cobalt source is at least one selected from the group consisting of a sulfate of cobalt, a nitrate of cobalt, and an acetate of cobalt; the manganese source is at least one selected from the group consisting of a sulfate of manganese, a nitrate of manganese, and an acetate of manganese;

(2) mixing a solution of a phosphate salt with the solution B to obtain a mixture, subjecting the mixture to a microwave hydrothermal treatment to obtain precipitate C, wherein the microwave hydrothermal treatment is carried out at a temperature of 140° C.-220° C. for 10-20 minutes;

(3) washing the precipitate C with water, followed by drying and grinding the precipitate C to obtain coated nickel-rich ternary precursor powder D; and (4) mixing the coated nickel-rich ternary precursor powder D with a lithium source to obtain a mixture, followed by subjecting the mixture to calcinating, grinding and screening to obtain the coated nickel-rich ternary material.

2. The coated nickel-rich ternary material according to claim 1, wherein a first reversible capacity of the coated nickel-rich ternary material is 173-195 mAh/g at a current of 0.1 C; a surface area of the coated nickel-rich ternary material is 27-38 m²/g.

3. A lithium battery comprising the coated nickel-rich ternary material according to claim 2.

4. The coated nickel-rich ternary material according to claim 1, wherein in step (2), the phosphate salt is at least one selected from the group consisting of ammonium dihydrogen phosphate, diammonium phosphate and ammonium phosphate.

5. The coated nickel-rich ternary material according to claim 1, wherein the calcinating is carried out at a temperature of 600° C.-900° C. for 8-16 h.

6. The coated nickel-rich ternary material according to claim 1, wherein in step (4), the lithium source is lithium carbonate or lithium hydroxide.

7. The coated nickel-rich ternary material according to claim 1, wherein in step (4), a molar ratio of lithium in the lithium source to a total amount of metal elements in the coated nickel-rich ternary precursor powder D is (1-1.1):1.

8. A lithium battery comprising the coated nickel-rich ternary material according to claim 1.

* * * * *